April 28, 1964
L. PÉRAS
3,131,052
METHOD AND APPARATUS FOR THE DIRECT REDUCTION OF IRON ORE INTO
PULVERULENT IRON BY MEANS OF A GASEOUS REDUCING AGENT
Filed April 7, 1961
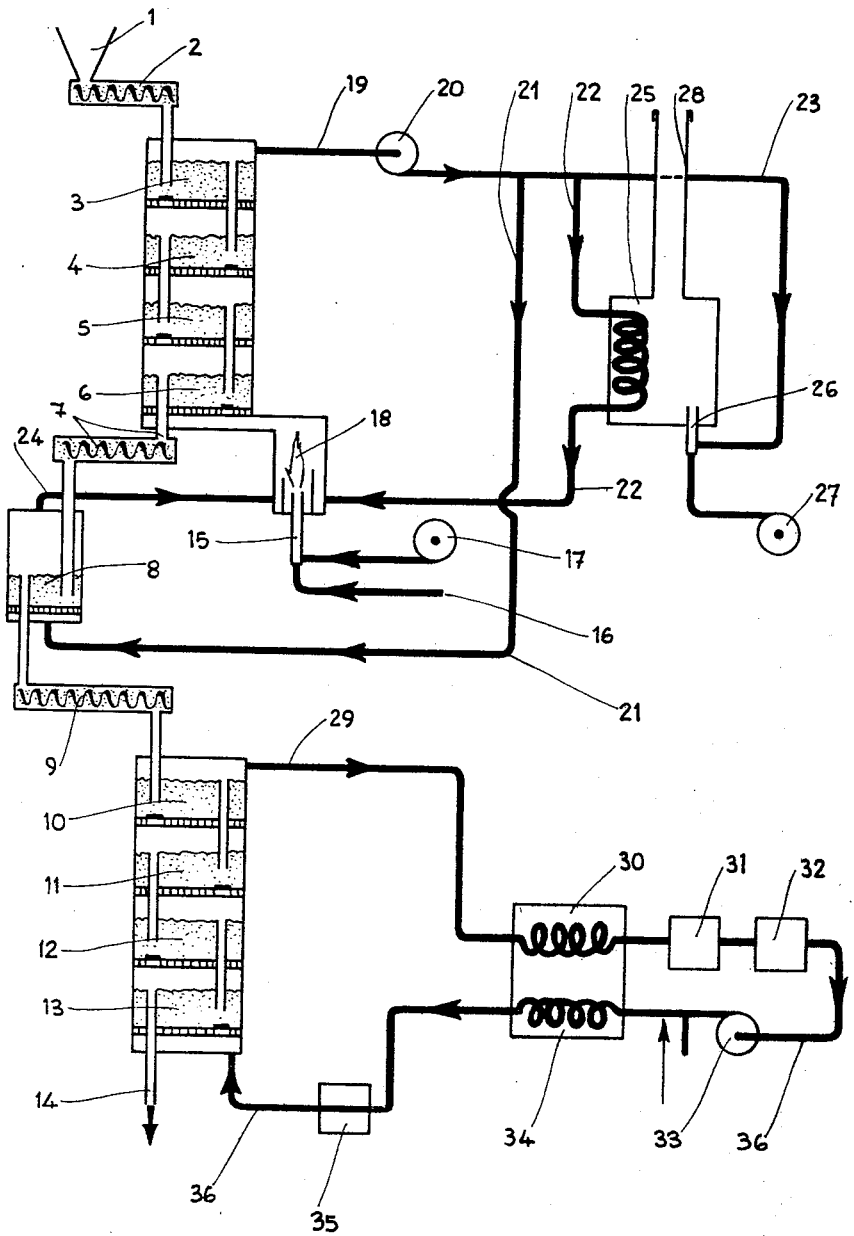
Inventor
Lucien Péras
By Stevens Davis Miller & Mosher
Attorneys

United States Patent Office 3,131,052
Patented Apr. 28, 1964

3,131,052
METHOD AND APPARATUS FOR THE DIRECT REDUCTION OF IRON ORE INTO PULVERULENT IRON BY MEANS OF A GASEOUS REDUCING AGENT
Lucien Péras, Billancourt, France, assignor to Regie Nationale des Usines Renault, Billancourt, France
Filed Apr. 7, 1961, Ser. No. 101,405
Claims priority, application France Apr. 13, 1960
2 Claims. (Cl. 75—26)

The methods of effecting the direct reduction of iron ore by means of a gaseous reducing agent are divided broadly into two groups: those of the first group utilizing carbon monoxide either pure or mixed with hydrogen yield carburized products; those issuing from the second group utilizing hydrogen alone are particularly costly. However, these methods may also be divided into two groups according to temperature; the first requires a relatively high temperature, for example above 750° C. (1,380° F.) which yields an iron agglomerated or sintered into lumps or loops, which is difficult to use; and the second is applicable at lower temperatures of the order of 550° C. (1,020° F.) and is costly due to the slowness of the reducing process.

It has now been discovered that it is possible to combine the advantages of both types of methods without having the inconveniences characterizing either of them by carrying out the ore reduction in two successive stages without effecting a complete intermediate cooling.

To this end, according to the present invention, the iron ore, for example magnetite or hematite, is first crushed to a very fine calibrated powder adapted to be used in the so-called fluidized bed reducing process, then heated and reduced to the state of ferrous oxide FeO by means of a high CO atmosphere containing CO, $CO_2$, $H_2$, $H_2O$ and $N_2$, then reduced during a subsequent phase to iron at a temperature of about 700° C. (1,290° F.) by using hydrogen directed through fluidized beds.

The method of this invention will now be described with reference to the attached drawing the single figure of which illustrates diagrammatically a typical apparatus constructed to this end.

According to this method, the iron ore is first crushed to a very fine calibrated powder suitable for carrying out the so-called fluidized bed reduction (that is, to a particle size ranging from about 40 to about 125 microns of mean diameter).

The powder thus obtained flows from the hopper 1 through the screw conveyor 2 into the first heater and fluidized-reduction apparatus of the reactor comprising a plurality of stages 3, 4, 5 and 6 disposed in cascade, and wherein a methodical countercurrent circulation of the iron powder and reducing gas is effected, the ore being heated and reduced to the state of ferrous oxide or protoxide of iron FeO by a gas issuing from the burner 15 and containing CO, $CO_2$, $H_2$, $H_2O$ and $N_2$, acting as a reducing agent of $Fe_2O_3$ or $Fe_3O_4$, but in equilibrium with FeO. The temperature rises up to a value ranging from 900° C. to 1,050° C. (1,650° F. to 1,920° F.), and preferably of 1,000° C. (1,830° F.) in the lowermost stage 6.

Thence, another screw conveyor 7 leads the ferrous oxide powder FeO to the cooling apparatus 8 wherein it is cooled in the form of a fluidized bed by the recycled cold gas from line 21; this gas contains CO, $CO_2$, $H_2$, $H_2O$ and $N_2$ in equilibrium with FeO at about 700° C. (1,290° F.), and its output is so adjusted that the temperature of the mixture in the fluidized bed has the value desired for the reduction of FeO into Fe by the action of hydrogen during the second step of the reduction, this temperature ranging from about 600° C. to about 750° C., and is preferably 700° C. (1,110° F.–1,380° F., preferably 1,290° F.).

The reducing gas is derived from the incomplete combustion of a high-methane gas or of a liquid or gaseous hydrocarbon, this gas being fed to 16 and the primary or combustion air to 17. The burner 15 is mounted in the combustion chamber 18 wherein the gas is restored to a temperature of about 1,000° C. (1,830° F.) by feeding recycled gas to 24 from cooler 8 and to 22 from the recycling fan 20.

After the heating and reducing steps the gas escapes from the uppermost stage 3 and is subjected to the suction exerted by the fan 20 before being divided into three fractions: the first fraction is fed through conduit 21 to the cooling apparatus 8; the second fraction fed through conduit 22 to regenerator 25 is reheated therein before being recycled to the combustion chamber 18; finally, the third fraction fed through conduit 23 is directed to the burner 26 of the regenerator so as to burn to $CO_2$ and $H_2O$ with the assistance of the secondary air from fan 27. The products of combustion flow through the regenerator so as to reheat the recycled gas, and are finally discharged through the chimney 28.

The ferrous oxide cooled to about 700° C. (1,290° F.) in the apparatus 8 is transferred by the screw conveyor 9 to the cascade of fluidized bed reduction apparatus 10, 11, 12 and 13 operated methodically in counter-current relationship and in a substantially isothermal manner between 600° C. and 750° C. (1,110° F.–1,380° F.), preferably at 700° C. (1,290° F.). The hot pulverulent reduced iron soaked with hydrogen is delivered through the conduit 14 and pure hydrogen is fed at a temperature of about 700° C. (1,290° F.) to the bottom of the first cascade apparatus 13 through the line 36.

In this reactor the hydrogen reduces the ferrous oxide FeO to yield pure iron and the gas becomes loaded with water. The moist hydrogen leaves the reactor through the line 29 at the reaction temperature, for example 700° C. (1,290° F.) and flows first through the heat transfer device 30 wherein it transfers its heat to the dry hydrogen to be heated, then through the condenser cooling apparatus 31 equipped with a water separator, and finally through a refrigerating condenser 32 in which it is cooled to $+1°$ C. (33.8° F.) as the traces of water in the liquid state are separated; then the gas is recycled through the pump 33 and flows again through the heat transfer device 34 in which it is reheated, then through the reheater 35 equipped with an external source of heat, and is finally introduced into the lowermost stage 13 of the reduction apparatus. The hydrogen consumed during the reduction is replaced by introducing pure hydrogen fed to a point of the circuit which is situated after the condenser 32 and before the reheater 35.

This method is advantageous is that reduction of $Fe_2O_3$ to FeO or $Fe_3O_4$ to FeO is accomplished during the first stage under the most economical conditions since this process is carried out at a relatively high temperature and by using a relatively cheap gas issued from the incomplete combustion of hydrocarbon. Thus, the quantity of hydrogen necessary for carrying out the second step is relatively low; moreover, as the ferrous oxide is delivered hot, the conditions of thermal economy and constructional simplicity of the apparatus are obtained simultaneously. Since the temperature is limited in this second step, iron reduced to a pulverulent state is obtained, and since the reduction is accomplished by hydrogen gas, pure iron without carbon is obtained.

I claim:
1. A method of reducing iron ore to metallic iron powder which comprises:
passing a fluidizing and reducing gas and finely divided iron ore through a plurality of fluidized beds arranged in cascade, said gas and said ore being passed in countercurrent relationship to one another, said fluidizing and reducing gas consisting essentially of CO, $CO_2$, $H_2$, $H_2O$ and $N_2$;

maintaining said fluidized beds at temperatures sufficient to effect reduction of the ore to FeO and to permit the FeO to be discharged as a powder at a temperature between about 900° C. and 1050° C.;

cooling the resulting FeO to about 700° C. by direct heat exchange with a portion of the gas leaving the plurality of fluidized beds after it has completely traversed said beds;

and thereafter subjecting the cooled FeO to reduction to metallic iron powder in a second series of fluidized beds in which the FeO is maintained in contact with hydrogen as the fluidizing gas, at a temperature of about 700° C. whereby a carbon-free iron powder is obtained as the reduction product.

2. The method of claim 1 including in addition the following steps:

recovering the gas leaving the plurality of fluidized beds arranged in cascade;

dividing the so recovered gas into three fractions;

burning the first of said recovered fractions with air to reheat said second fraction;

recycling the reheated second fraction to said first plurality of fluidized beds to serve as a portion of the fluidizing gas mixture;

and utilizing the third fraction of said gas as the gas for cooling the FeO by direct heat exchange therewith.

References Cited in the file of this patent

UNITED STATES PATENTS

| | | |
|---|---|---|
| 2,282,144 | Fahrenwald | May 5, 1942 |
| 2,547,685 | Brassert et al. | Apr. 3, 1951 |
| 2,711,368 | Lewis | June 21, 1955 |
| 2,752,234 | Shipley | June 26, 1956 |
| 2,864,688 | Reed | Dec. 16, 1958 |
| 2,890,106 | Heath | June 9, 1959 |
| 2,911,290 | Jonke et al. | Nov. 3, 1959 |

FOREIGN PATENTS

| | | |
|---|---|---|
| 508,600 | Belgium | Feb. 15, 1952 |
| 1,058,821 | France | Nov. 10, 1953 |